United States Patent
Oikawa et al.

(10) Patent No.: US 7,648,117 B2
(45) Date of Patent: Jan. 19, 2010

(54) INJECTION MOLD ASSEMBLY

(75) Inventors: Wataru Oikawa, Tochigi (JP); Tsuyoshi Namioka, Tochigi (JP)

(73) Assignee: Nippon Platec Co., Ltd., Nasu-gun (JP)

( * ) Notice: Subject to any disclaimer, the term of this patent is extended or adjusted under 35 U.S.C. 154(b) by 25 days.

(21) Appl. No.: 11/954,993

(22) Filed: Dec. 12, 2007

(65) Prior Publication Data

US 2008/0145472 A1    Jun. 19, 2008

(30) Foreign Application Priority Data

Dec. 15, 2006   (JP) .............................. 2006-337724

(51) Int. Cl.
B29C 45/26 (2006.01)

(52) U.S. Cl. ................... 249/116; 264/338; 425/542; 425/556; 425/567

(58) Field of Classification Search .............. 249/114.1, 249/115, 116; 425/542, 556, 567; 106/38.22, 106/38.27; 264/338
See application file for complete search history.

(56) References Cited

U.S. PATENT DOCUMENTS

| | | | | |
|---|---|---|---|---|
| 3,380,121 A | * | 4/1968 | Chittenden et al. .......... | 425/528 |
| 5,176,839 A | * | 1/1993 | Kim ............................. | 249/78 |
| 5,535,980 A | * | 7/1996 | Baumgartner et al. .... | 249/114.1 |
| 5,609,922 A | * | 3/1997 | McDonald .................. | 427/447 |
| H1654 H | * | 6/1997 | Rounds ....................... | 264/511 |
| 5,741,446 A | * | 4/1998 | Tahara et al. ................ | 264/1.9 |
| 5,882,692 A | * | 3/1999 | Kojima et al. ............... | 425/116 |
| 6,872,069 B2 | * | 3/2005 | Starkey ....................... | 425/556 |
| 7,018,576 B2 | * | 3/2006 | Kosuge et al. .............. | 264/132 |
| 7,241,405 B1 | * | 7/2007 | Crain et al. .................. | 264/39 |
| 2004/0051026 A1 | * | 3/2004 | Flynn .......................... | 249/116 |
| 2004/0145090 A1 | * | 7/2004 | Kanematsu et al. ......... | 264/500 |

OTHER PUBLICATIONS

Geller et al., Sulfonitriding of Steels for Pressure Casting Molds, 1972, Consultant's Bureau, pp. 1035-1037. (Translation from Moscow Machine-Tool Institute, Metallovedenie i Termichskaya Obrabotka Metallove, No. 12, pp. 40-43, Dec. 1971.).*

* cited by examiner

*Primary Examiner*—Yogendra Gupta
*Assistant Examiner*—Emmanuel S Luk
(74) *Attorney, Agent, or Firm*—Oblon, Spivak, McClelland, Maier & Neustadt, L.L.P.

(57) ABSTRACT

A cavity is formed between stationary and movable mold members, and a runner is connected to a gate to the mold cavity to supply a molten resin material thereto. The stationary and movable mold members have bodies of an aluminum alloy of high heat conductivity and light weight. Iron base plating is applied at least to transfer wall surfaces of the cavity, leaving and exposing other wall surfaces in a non-plated state.

13 Claims, 6 Drawing Sheets

INJECTION MOLD ASSEMBLY

TECHNICAL FIELD

This invention relates to a mold assembly for use in injection molding, and more particularly to an injection mold assembly employing mold halves with bodies of an aluminum alloy.

TECHNICAL BACKGROUND

Generally, injection molds have a steel body because of a number of advantages such as high durability and high repeated transfer accuracy. However, fabrication of a steel mold is difficult and takes a long time to invite a considerable increase in fabrication cost. Besides, steel molds have a number of disadvantages such as low heat conductivity and heaviness. Taking these points into consideration, injection molds of a material other than steel have been developed and put in use. Among the new developments is an injection mold of aluminum which is superior in machinability and can be fabricated in a shorter time and at a lower cost. Besides, high heat conductivity can contribute to shorten the time of a molding cycle. Further, an aluminum mold which is lighter in weight is advantageous from a standpoint of facilitating various operations such as connections and disconnections to and from a molding machine, mold transfer and mold assembling.

Therefore, aluminum, especially an aluminum alloy is hopeful as a material for injection molds. However, as compared with an iron mold, an aluminum mold is inferior in hardness and resistance to abrasion. Plastics which are used in injection molding are mostly thermoplastic resins, and in many cases a reinforcing material such as glass fiber, for example, is mixed into a plastic material for the purpose of enhancing the strength of moldings. Aside from those cases where glass fiber is mixed only in a small proportion, when molten plastic material is introduced into a mold cavity through a sprue, runner and gate, it is very likely that wall surfaces en route are abraded to a considerable degree particularly in a case the plastic material contains glass fiber in a high proportion, for example, in a proportion in excess of 40%. This gives rise to a problem that abraded aluminum powder is mixed into the molten plastic material to cause abrasion of inner surfaces of a mold cavity, degrading transfer accuracy of the mold and surface accuracy of moldings in a prematurely early stage, resulting in a shortened life span of the mold. For these reasons, despite a number of advantages, aluminum molds have been applied to injection molding on a small scale, producing up to 100 moldings from an aluminum mold, and have not been resorted to in mass scale injection molding.

Various attempts have thus far been made to prolong the service life of aluminum molds. For example, in one case, an attempt is made to fabricate an injection mold by the use of a hard aluminum alloy which is less susceptible to abrasion like extra super duralumin (A7075), for example. However, as compared with steel molds, even extra super duralumin is still unsatisfactory in durability and found to be insufficient in hardness as an injection mold depending upon the nature of a plastic material to be molded.

On the other hand, in another case, an attempt is made to prolong the service life of an aluminum mold by hardening interior surfaces of a mold including a mold cavity. For example, Japanese Laid-Open Patent Application H7-3470 describes fabrication of a mold assembly by the use of an aluminum alloy, the mold assembly consisting of stationary mold and a movable mold which internally define a cavity. In this case, with or without a prior alumite treatment, an ion beam, mainly of argon, is irradiated on mold surfaces to form a hardened layer thereon, followed by deposition of a nitride film layer by sputtering in a nitrogen atmosphere using titanium and aluminum as targets and further followed by electroless nickel plating.

In order to impart aluminum mold surfaces with a certain degree of hardness, the hardening treatment process requires multiple stages of hardening treatments as mentioned above, which are extremely complicate and troublesome, depriving of inherent advantages of an aluminum mold such as high machinability, shorter fabrication time and low cost. In addition, the electroless nickel plating in the last stage is effected on the entire surfaces of a mold. However, in case entire joint surfaces on both of stationary and movable mold members are plated with nickel which is lower in heat conductivity than aluminum, the stationary and movable mold members are put in a thermally shielded state, resulting in degradations in heating efficiency and in cooling efficiency as well. This may give rise to heat variations within the mold cavity due to a temperature difference between stationary and movable mold members to invite degradations in molding accuracy and mold releasing failures.

SUMMARY OF THE INVENTION

In view of the foregoing situations, it is an object of the present invention to provide an injection mold assembly employing mold members of aluminum which is excellent in machinability, the aluminum mold members having hardened surfaces on limited parts essential to ensure smooth and efficient injection molding.

It is another object of the present invention to provide an injection mold assembly employing aluminum mold members which are substantially equal to steel molds in durability and shape transfer accuracy, the aluminum mold members being significantly light in weight as compared with steel molds and having high heat conductivity.

According to the present invention, in order to achieve the above-stated objectives, there is provided an injection mold assembly composed of stationary and movable mold members defining a cavity therebetween, a gate connected to the cavity to supply a molten resin material thereto, and a runner connected to the gate, characterized in that: the stationary and movable mold members are formed of an aluminum alloy and plated with an iron-base metal at least on transfer surfaces of the cavity; except plated surfaces of the cavity, the stationary and movable mold members having other wall surfaces exposed in a non-plated state.

In an injection mold assembly, a cavity is formed between stationary and movable mold members by bringing a movable mold member into abutting engagement with a stationary mold member. Accordingly, inner wall surfaces of the cavity are separable to the stationary and movable sides of the mold assembly. Iron-base plating is applied in a limited fashion to transfer surfaces of the cavity of an aluminum alloy mold, leaving other wall surfaces of the aluminum alloy in a non-plated state. In plating inner wall surfaces of an aluminum alloy mold, it is desirable to deposit a plating metal up to a point a little bit overreaching boundaries between plating and non-plating wall surfaces, i.e., a little bit overriding onto abutting surfaces of split mold members. In order to partially plate stationary and movable mold members in this manner, after forming cavities on stationary and movable mold members, non-plating wall surfaces are masked prior to plating with an iron-base metal. Examples of iron-base metal include iron and an iron alloy such as Fe—Cr alloy.

In this regard, plating of an iron-base metal is applied at least to inner wall surfaces of a mold cavity and preferably to inner wall surfaces of a molten mold passage en route to the cavity, including a runner and a gate, for the purpose of enhancing hardness and abrasion resistance. From a standpoint of abrasion resistance, the hardness can be further increased by treating plated surfaces by an immersed sulfonitriding treatment as a post-treatment of iron-base metal plating. Further, it is desirable to polish and smoothen out plated surfaces to ensure smooth flow of a molten resin material. Furthermore, in case the injection mold assembly include a sprue upstream of a runner, it is desirable to apply the iron-base metal plating also to inner wall surfaces of the sprue. There is no need for plating inner surfaces of a sprue in case a separate sprue member of steel is fitted in a stationary mold member.

In some cases, a cavity is formed directly between a stationary mold member and a movable mold member. Alternatively, a cavity may be formed by way of a core in a case where both or either one of stationary and movable mold member is composed of a set of a template and a core of an aluminum alloy. In such a case, iron-base metal plating is limited to cavity-forming wall surfaces of the core, exposing other wall surfaces of an aluminum alloy in a non-plated state. A template which incorporates heating and cooling means for a resin material is also formed of an aluminum alloy. In a case where an injection mold assembly templates, runner-gate structures carved with a molten resin supply passage including a runner and gate may be set in the templates along with cores. In this case, iron-base metal plating is applied to inner wall surfaces of the molten resin supply passage, leaving other wall surfaces of the runner-gate structures in a non-plated state.

A knockout pin or a knockout sleeve is usually provided on a mold assembly for the purpose of ejecting a molded product at the end of a molding cycle. The knockout pin or sleeve of this sort is arranged to slide within a bore which is formed in a movable mold member. Therefore, it is also desirable to apply iron-base plating to inner surfaces of the slide pin receptacle bore for the purpose of ensuring smooth sliding movements. When moving a movable mold member toward or away from a stationary mold member, the movable mold member is usually retained in an aligned position relative to the latter by guide pins which are provided on the movable mold member in sliding engagement with guide bores on the part of the stationary mold member. Accordingly, preferably iron-base plating is applied also to inner surface of such guide holes.

In this manner, by forming stationary and movable mold members of an injection mold assembly by the use of an aluminum alloy which is high in heat conductivity and easy to machine, it becomes possible to fabricate injection molds within a shorter time and at a lower cost. Besides, stationary and movable mold members can be heated or cooled off quickly over the entire mold cavity. This leads to a shorter molding cycle permitting to produce moldings very efficiently. Since interior surfaces of a cavity on the mold members of an aluminum alloy are hardened by a plated iron-base metal, they have sufficiently high abrasion resistance comparable to steel molds and can maintain an accurate transfer surface profile over a long period of time.

The above and other objects, features and advantages of the present invention will become apparent from the following particular description of the invention, taken in conjunction with the accompanying drawings which show by way of example a preferred embodiment of the invention. Needless to say, the present invention is not limited to particular forms shown in the drawings.

BEST MODE FOR CARRYING OUT THE INVENTION

Figure 2:
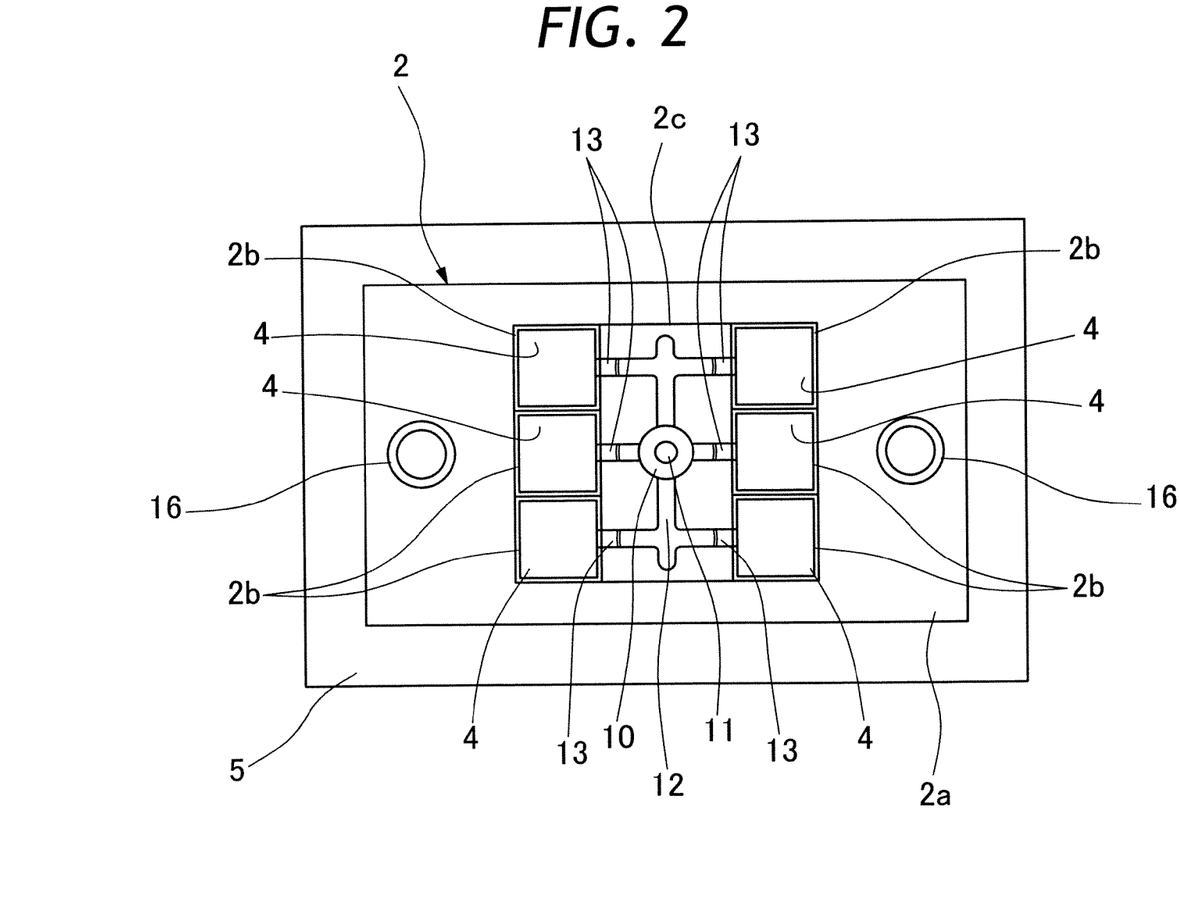
FIG. 2 is a schematic plan view of a stationary mold member in the mold assembly of FIG. 1.
Figure 3:
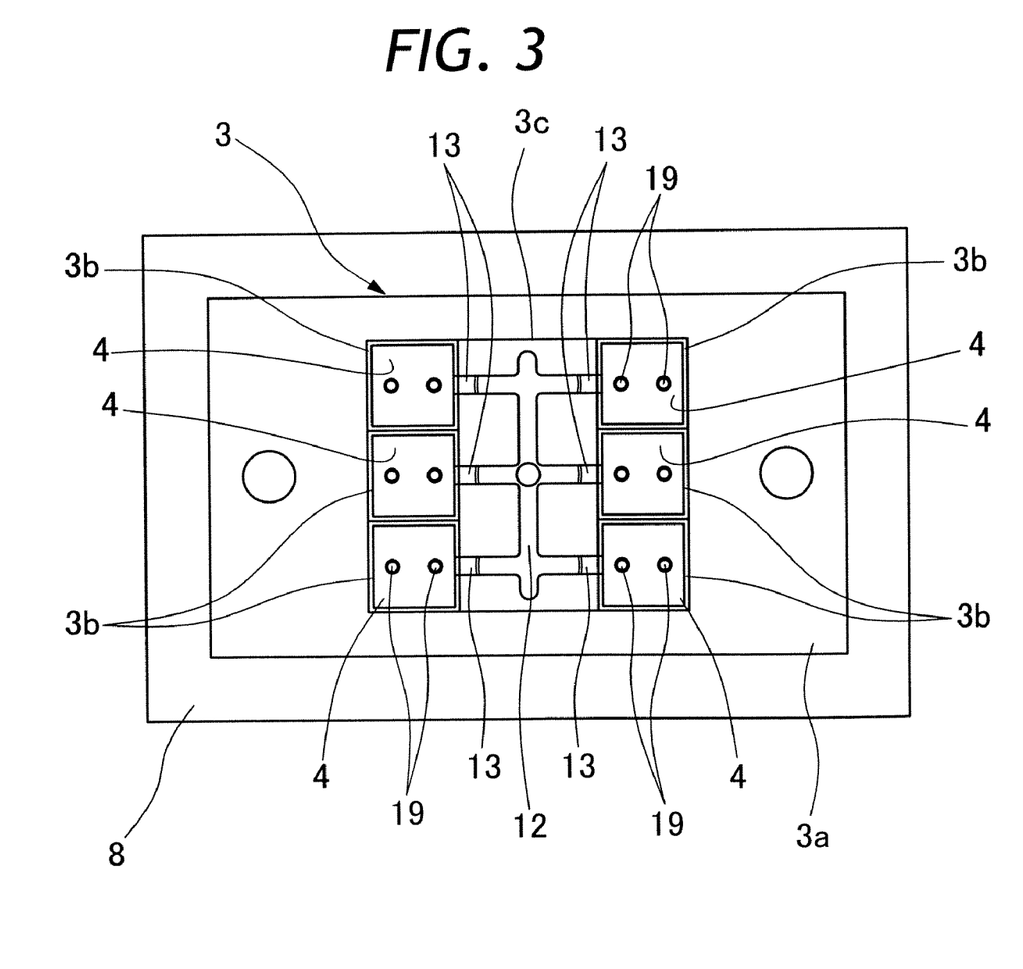
FIG. 3 is a schematic plan view of a movable mold member in the mold assembly of FIG. 1.

Hereafter, the present invention is described more particularly by way of its preferred embodiment which is shown in the accompanying drawings. Shown in FIG. 1 in a sectional view is an injection mold assembly according to the present invention. As clear from that figure, the injection mold 1 is provided with a stationary mold member 2 of FIG. 2 and a movable mold member 3 of FIG. 3. Cavities 4 are formed between the stationary and movable mold members 2 and 3 which are closed in abutting relation with each other. In this instance, the stationary and movable mold members 2 and 3 are composed of templates 2a and 3a and cores 2b and 3b, respectively. Cavities 4 are formed between opposing cores 2b and 3b. Although, the templates 2a, 3a and cores 2b, 3b of the stationary and movable mold members 2 and 3 are shown as separate members, but these templates and cores may be integrated into one mold structure if desired.

Figure 1:
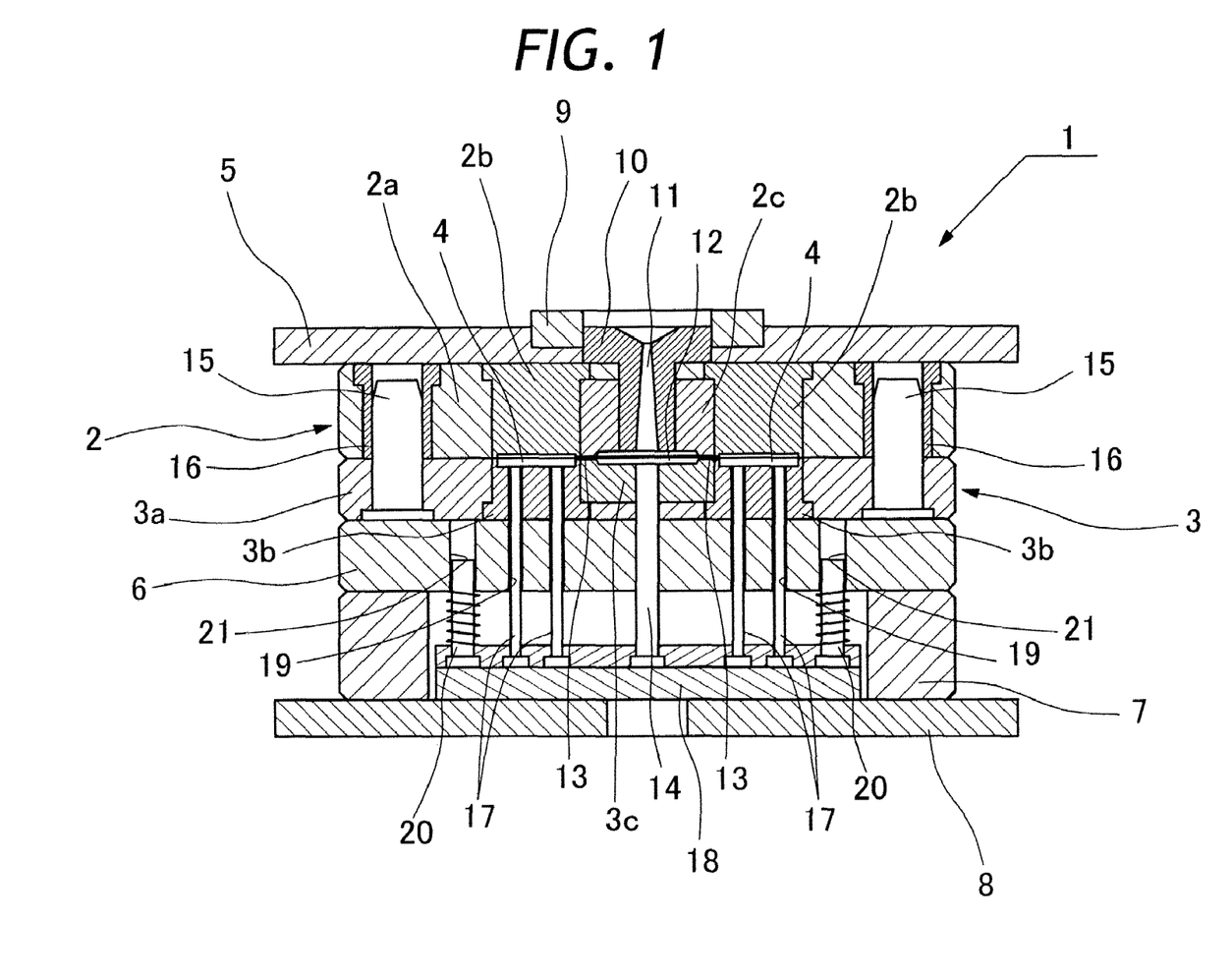
FIG. 1 is a schematic sectional view of an injection mold assembly embodying the present invention.

The stationary mold member 2 is fixedly mounted on a stationary mount plate 5, while the movable mold member 3 is attached to a movable mount plate 8 through a spacer block 7. Fixed on the stationary mount plate 5 is a locate ring 9 to be connected to an injection cylinder (not shown). A sprue bush 10 is fitted in the locate ring 9 on the stationary mount plate 5. The sprue bush 10 is extended inward of the stationary mold member 2 through the stationary mount plate 5, internally forming a sprue 11 to serve as a molten resin supply passage. The sprue 11 is in communication with a runner 12 which is in turn in communication with the respective cavities 4 through gates 13. In this instance, a sprue lock pin 14 is extended toward a junction of the sprue 11 and runner 12 thereby to remove residual resin in the sprue 11.

The movable mold member 3 which is connected to the movable mount plate 8 through backing support plate 6 and spacer block 7 is movable toward and away from the stationary mold member 2. Guide pins 15 which are provided on the movable mold member 3 are slidably received in guide bushes 16 on the part of the stationary mold member 2 for the purpose of keeping the movable mold member 3 in an aligned position relative to the latter when in a movement. Further, as soon as a molding cycle within the cavities 4 comes to an end, knockout pins 17 are pushed up to release moldings in the respective cavities. The knockout pins 17 are mounted on a lift plate 18 and projected as far as cavities 4 by way of bores 19 which are formed through the template 3a and cores 3b. As the lift plate 18 is lifted off the movable mount plate 8 over a predetermined stroke length, the moldings in the cavities 4 are pushed up by the respective knockout pins 17. By return springs which are fitted on return pins 20, the lift plate 18 is returned from a lifted position to the initial rest position on the movable mount plate 8. Projected ends of the return pins 20 are slidably received in bores 21 which are formed in the template 3a of the movable mold member 3.

The injection mold assembly of the above-described construction is further provided with heating and cooling means for heating and cooling a plastic resin material in the cavities 4. Generally, a rod type or band type heater is employed as heating means, while as cooling means a water or air cooling system is incorporated into the templates 2a and 3a. These heating and cooling means are well known in the art, so that description or illustration of such heating and cooling means is omitted here.

The movable mold member 3 is driven toward and abutted against the stationary mold member 2 to close the injection mold 1, and the mold 1 is clamped in the closed state by applying a predetermined pressure. In this state, an injection cylinder is connected to the locate ring 9 to supply molten resin to the respective cavities 4 from the sprue 11 through the runner 12 and gates 13. At this time, the stationary mold member 2 as well as the movable mold member 3 is maintained in a heated state by heating means to ensure that the respective cavities 4 are fully filled with the molten resin material.

As soon as the cavities 4 are fully filled with the molten resin material, the heating means is turned off to stop heating, and in turn the cooling means is turned on to start cooling. By dropping the temperature of cavities 4 to a predetermined level, the molten resin is cured and molded to shape. Then the movable mold member 3 is lowered and separated from the stationary mold member 2 for mold release. In the next place, the knockout pins 17 are pushed up to eject moldings. After ejection of moldings, the knockout pins 17 are returned to the initial rest position by the action of the return pins 20. This is an end of one cycle of molding, and the same cycle of operation is repeated to produce moldings successively.

During the injection molding cycles as described above, the cavities 4 of the mold are repeatedly heated and cooled. In this regard, in order to shorten the heating and cooling time periods, the injection mold 1 needs to be made of a material of high heat conductivity. Besides, in order to permit smooth mold closing and opening operations by application of a smaller load, it is necessary to lessen the weight of the injection mold 1, especially the weight of the movable mold member 3 including the support plate 6 and spacer block 7. On the other hand, the injection mold 1 is required to have a high mechanical strength in various parts, especially in the cavities 4 as well as in the molten resin supply passage including the runner 12 and gates 13, which are subjected to a high molding pressure. In order to fulfill the requirements for high thermal conductivity and lightness in weight, an aluminum alloy is used for various parts of the injection mold assembly 1, especially, for the stationary and movable mold members 2 and 3 which jointly form molten resin passages. Further, the backing support plate 6 and spacer block 7 are also formed of an aluminum alloy from the standpoint of weight reduction. However, it is desirable that the stationary mount plate 5 as well as the movable mount plate 8 is a steel plate for the sake of strength.

In order to secure a sufficient strength against molding pressures which are repeatedly applied on the stationary and movable mold members 2 and 3, for example, there may be employed an aluminum alloy such as an Al—Mg alloy or an Al—Zn—Mg alloy. Alternatively, an Al—Cu—Mg alloy, namely, duralumin can also be suitably used.

The above-mentioned aluminum alloys are soft metals and lower in hardness than iron. A metal which is low in hardness means that it is easy to machine and permits to manufacture a mold in a shorter time and at a lower cost. However, if aluminum alloy is exposed on transfer surfaces of the stationary and movable mold members 2 and 3 or on wall surfaces of the runner 12 and gates 13, those surfaces will be abraded by glass fiber in a supplied molten resin material and worn out prematurely in an early stage, lowering the durability of the mold.

To cope with this problem, for hardening purposes, iron-base plating is applied to wall surfaces of molten resin supply passages en route to mold cavities, namely, to inner wall surfaces of the runner 12, gates 13 and cavities 4 which will contact a molten resin material. There is no need for applying the iron-base plating to inner surfaces of the sprue 11 at the entrance to the molten resin supply passage in case it is formed in a bush 10 of a steel material. In other words, inner surfaces of the sprue 11 are preferably plated with an iron-base metal in case it is formed in a bush 10 of an aluminum alloy.

Iron base plating applied to the stationary and movable mold members only on limited wall surfaces of a molten resin supply passage en route as mentioned above, leaving other wall surfaces in a non-plated or naked state. Namely, iron-base plating is limited to inner wall surfaces of the cavities 4, gates 13 and runner 12, leaving surfaces of other parts of the mold 1 including templates 2a and 3a and cores 2b and 3b in a non-plated state. Therefore, when the injection mold assembly 1 is closed, the stationary and movable mold members 2 and 3 are brought into contact with each other through joint surfaces of a sheer aluminum alloy with high heat conductivity. Accordingly, heat conduction takes place in an accelerated manner between the stationary and movable mold members 2 and 3, increasing the temperature in the cavities 4 speedily and uniformly in the entire regions of the cavities 4 where a molten resin has been introduced. As a consequence, it becomes possible to obtain moldings of high quality especially of high transfer accuracy. Besides, since aluminum alloy surfaces are mostly exposed to the outside, heat can be released quickly in a cooling stage, contributing to shorten a cooling time.

In this regard, the heat conductivity of aluminum is 240 $W \cdot m^{-1} \cdot K^{-1}$ while the heat conductivity of carbon steel which is generally used for steel molds is 48.5 $W \cdot m^{-1} \cdot K^{-1}$. Thus, heating and cooling can be completed in a far shorter time in the case of an aluminum mold which is five to six times higher in heat conductivity as compared with a steel mold. This also means that energy consumption can be reduced drastically. With regard to specific gravity, aluminum has a specific gravity of 2.70 which is far smaller as compared with steel the specific gravity of which is approximately 7.85. This means that the injection mold 1 as a whole can be reduced in weight, facilitating its assembling work and permitting to close and open the molds smoothly by application of a lighter load.

As mentioned above, the stationary and movable mold members 2 and 3 are partially covered with iron-base plating. The iron-base plating is applied to those surface areas of the cores 2b and 3b which will form inner surfaces of the cavities 4 as well as to those surface areas which will form inner wall surfaces of a molten resin supply passage en route to mold cavities 4, including the runner 12 and gates 13. Therefore, in addition to the cores 2b and 3b with cavities 4, runner-gate structures 2c and 3c are provided separately from the templates 2a 3a. Namely, the stationary and movable mold members 2 and 3 are built of a template 2a or 3a, cores 2b or 3b and a runner-gate structure 2c or 3c.

Exterior surfaces of the templates 2a and 3a are entirely free of plating and have no need for iron-base plating. Except those wall surfaces which will form the cavities 4 and gates 13, other surfaces of the cores 2b and 3b are left free of plating. Further, except the runner 12 and gates 13 which need iron-base plating, other surfaces of the runner-gate structures 2c and 3c are left free of plating.

Figure 4:
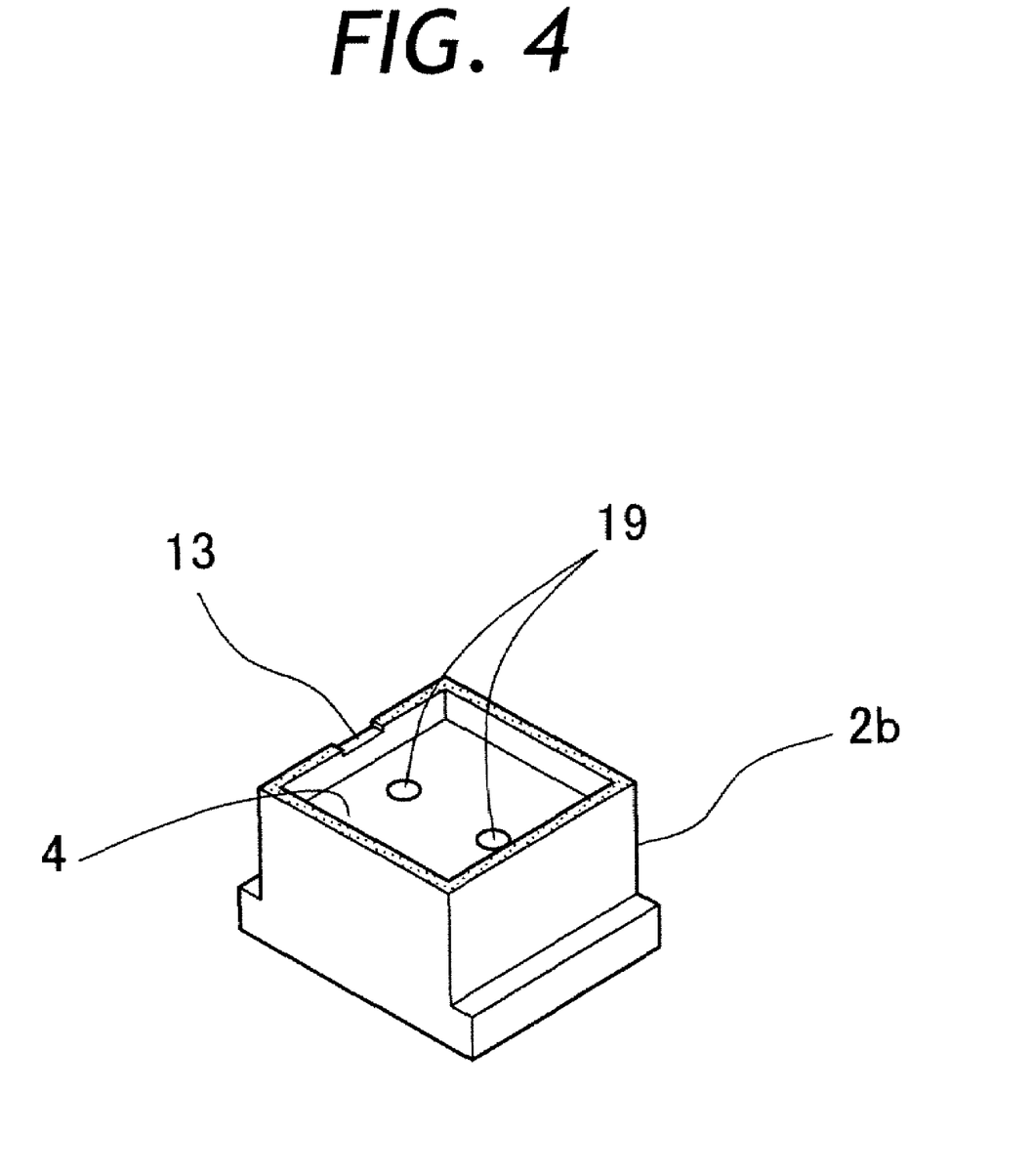
FIG. 4 is a schematic outer view of a core.
Figure 5:
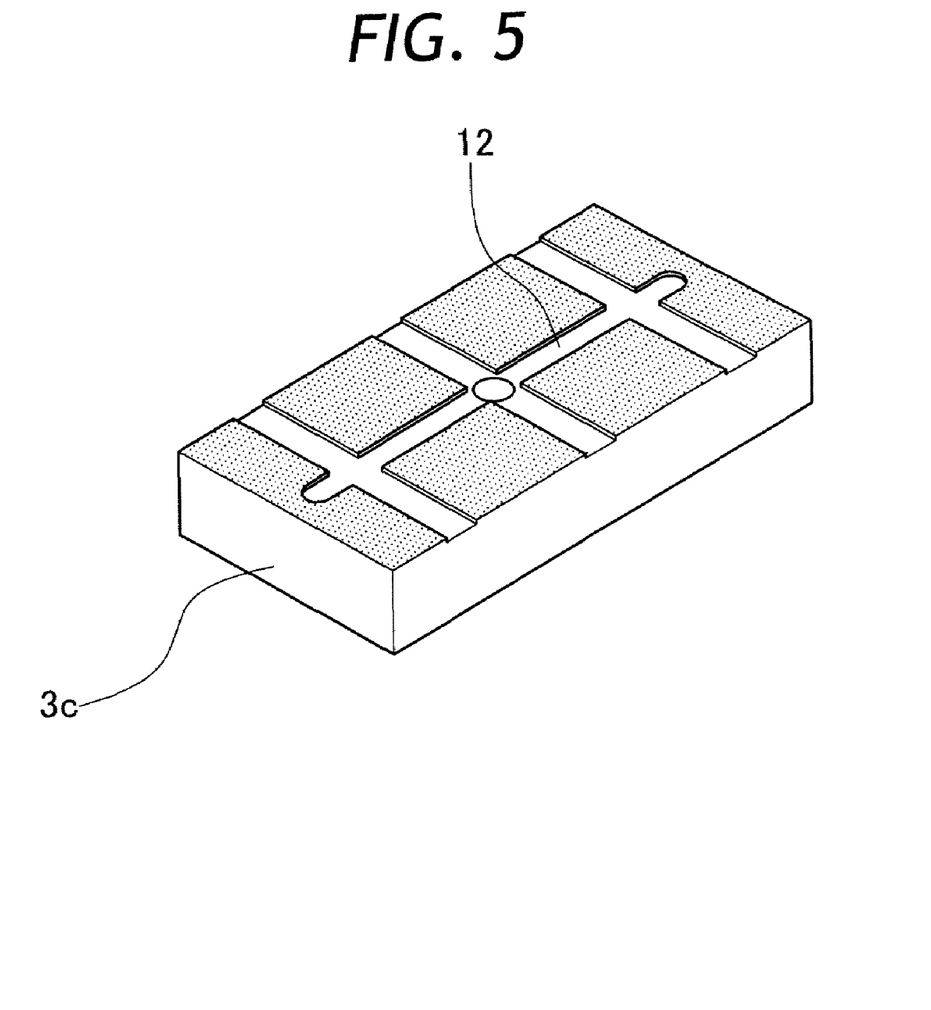
FIG. 5 is a schematic outer view of a runway structure.
Figure 6:
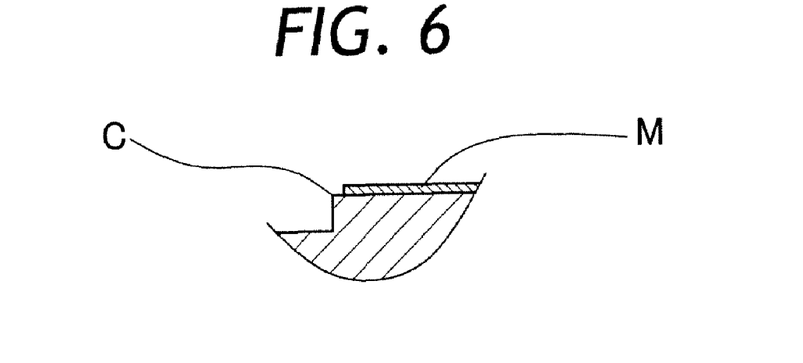
FIG. 6 is an enlarged sectional view showing a boundary portion of masking which is applied at the time of plating cores and runner-gate structures.

Non-plating surfaces on the cores 2b and 3b and on the runner-gate structures 2c and 3c may be entirely masked beforehand. However, the masking may be applied only to the shaded surface areas in FIGS. 4 and 5, leaving other surfaces on lateral and rear sides of the runner-gate structures 2c and 3c unmasked. The limitation of masking to these small surface areas will make the masking and unmasking work far easier. At the boundaries of masked and unmasked surfaces, which will come into contact with molten resin, a masking material M is applied short of a boundary corner C as shown in FIG. 6, so that the plating will be applied up to a point a little beyond the boundary corner C.

Figure 7:
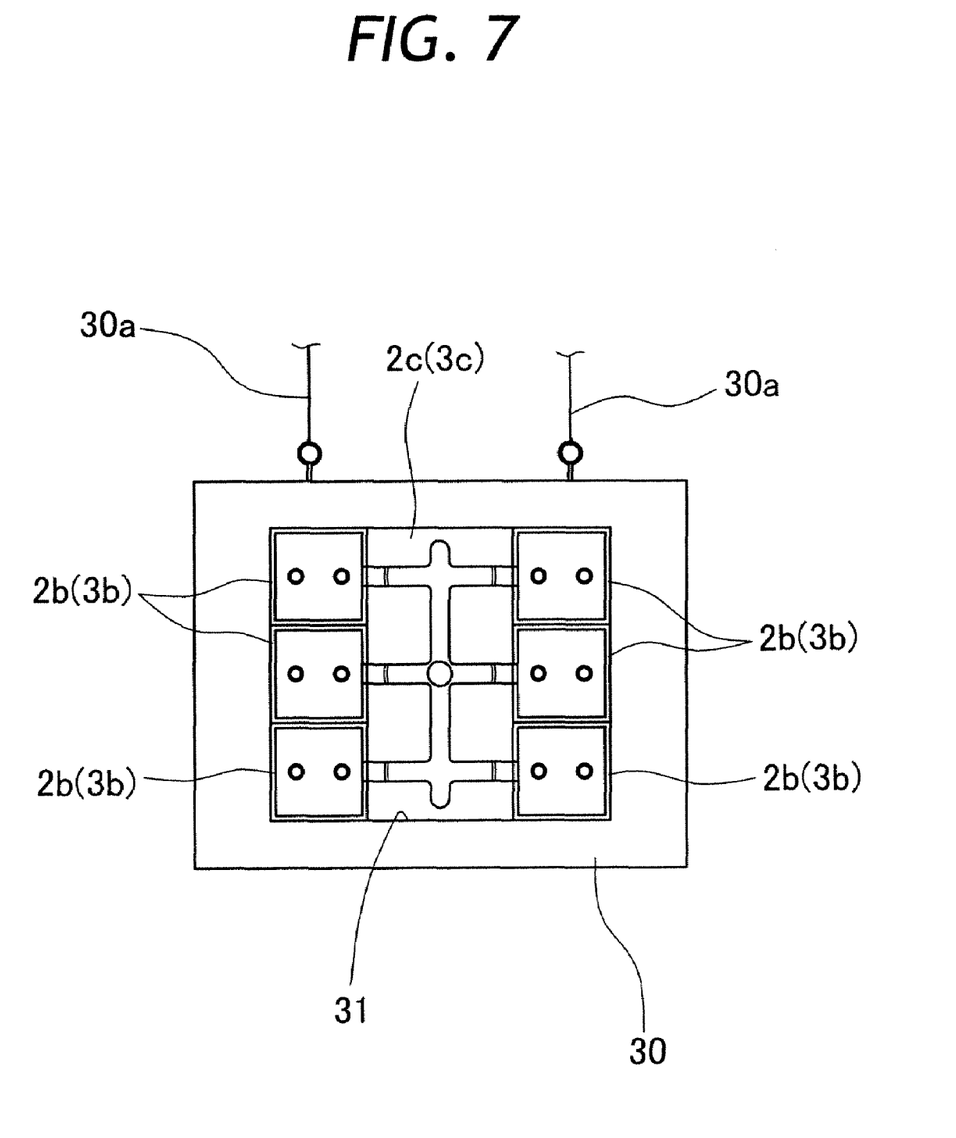
FIG. 7 is a front view of cores and a runner structure which are set on a plating hunger.

At the time of electrolytic plating, these cores 2b or 3c and runner-gate structure 2c or 3c is partially plated on a hanger 30 which is connected to suspension wires 30a as shown in FIG. 7. The cores 2b or 3b and the runner-gate structure 2c or 3c are set in a recessed pocket 31 which is provided on the hanger 30. More specifically, the cores 2b or 3b and the runner-gate structure 2c or 3c are fitted in the pocket 31 on the hanger 30 such that the plating sides of the cores 2b or 3c and runner-gate structure 2c or 3c are all faced outward in the same way on the front side of the hanger 30, and are disposed flush with the surface of the hanger 30. By arranging the cores 2b or 3b and the runner-gate structure 2c or 3c in this manner, an iron-base metal can be plated only on necessary surfaces by the use of minimum masking. For the purpose of enhancing the hardness of plated surfaces, it is desirable to conduct an immersed sulfonitriding treatment with the masking on.

In this connection, the wall surfaces of the cavities 4 determine the shape of moldings as transfer surfaces, while the runner 12 and gates 13 have an influence on the flow of molten resin. On the above-described plated surfaces, the thickness of plating is in the range between several μm and several tens μm. Subsequent to plating, it is desirable to smoothen out and impart a homogeneous shape to the plated surfaces by a polishing operation. Further, the hardening plating is also applied to inner surfaces of the knockout pin receptacle bores 19 in the template 3a and core 3b and to inner surfaces of the return pin receptacle bore 21 in the template 3a to ensure smooth sliding movements of the knockout pins 17 and return pins 20. Thus, the present invention has succeeded in fabricating an injection mold of aluminum which is improved in heat conductivity and reduced in weight despite possession of characteristics equal to iron molds.

What is claimed is:

1. An injection mold assembly, comprising:
   stationary and movable mold members that define a cavity therebetween;
   a gate connected to said cavity that supplies a molten resin material thereto; and
   a runner connected to said gate,
   wherein said stationary and movable mold members include an aluminum alloy,
   said gate and said runner are disposed at adjoining surfaces between said stationary and said moveable mold members,
   inner wall surfaces of said cavity, said gate, and said runner are arranged to form a molten resin supply passage and are plated with an iron-base metal, and
   wall surfaces between said stationary and moveable mold members that contact each other are kept exposed in a non-plated state.

2. An injection mold assembly as set forth in claim 1, wherein at least one of said stationary and movable mold members comprises a template and a core that each includes iron-base plating on a wall surface that forms part of said cavity, leaving other wall surfaces in a non-plated state.

3. An injection mold assembly as set forth in claim 2, wherein said stationary and movable mold members further comprises a runner-gate structure engraved with a half of said molten resin supply passage leading to said cavity, including said runner and gate, said runner-gate structure being provided separately from said template and set in said template along with said core, and said runner-gate structure includes inner wall surfaces of said molten resin supply passage plated with an iron-base metal, leaving other wall surfaces in a non-plated state.

4. An injection mold assembly as set forth in claim 3, wherein plated inner surfaces of said molten resin supply passage include a corner portion in a boundary region bordering on a non-plated surface.

5. An injection mold assembly as set forth in claim 1, further comprising:
   a bore that slidably receives a knockout pin that ejects a molded product from said core; and
   bores that slidably receive return pins that return said knockout pin to an initial rest position, each one of said bores including inner surfaces thereof plated with an iron-base metal.

6. An injection mold assembly as set forth in claim 1, wherein said plated surfaces are hardened by an immersed sulfonitriding treatment.

7. An injection mold assembly as set forth in claim 1, wherein said plated surfaces are smoothened out by a polishing treatment.

8. An injection mold assembly as set forth in claim 1, wherein a sprue bush with a sprue is mounted on said stationary mold member.

9. An injection mold assembly as set forth in claim 1, wherein said movable mold member is provided with a bore that slidably receives a knockout pin that ejects a molded produce out of said cavity, said bore for said knockout pin including inner surfaces thereof plated with an iron-base metal for hardening purposes.

10. An injection mold assembly as set forth in claim 1, wherein said aluminum alloy is an Al—Mg base alloy, Al—Zn—Mg base alloy or Al—Cu—Mg base alloy.

11. An injection mold assembly as set forth in claim 1, wherein said iron-base metal is an iron alloy based on iron or Fe—Cr.

12. An injection mold assembly as set forth in claim 1, wherein said inner wall surfaces are plated with an iron-base metal by electrolytic plating.

13. An injection mold assembly as set forth in claim 1, wherein a thickness of the plating is less than 100 μm.

* * * * *